A. J. SALTSMAN.
CAKE MIXER AND EGG BEATER.
APPLICATION FILED NOV. 29, 1907.
900,210.
Patented Oct. 6, 1908.
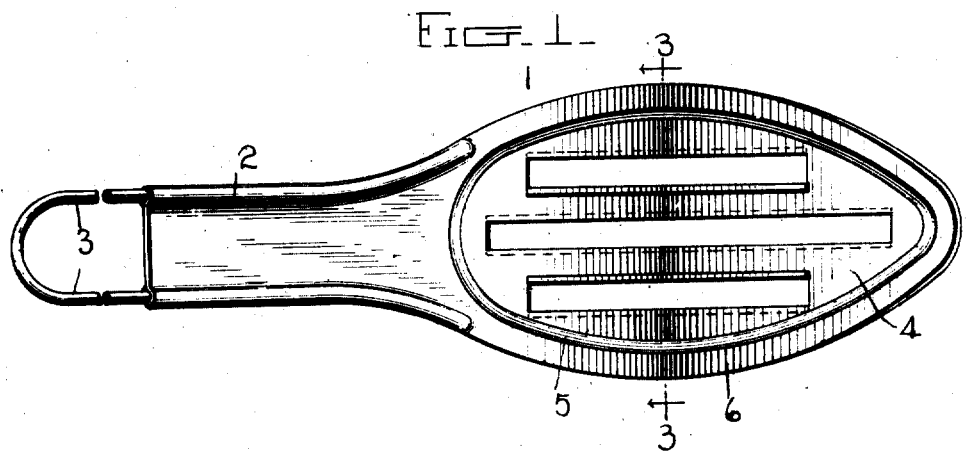
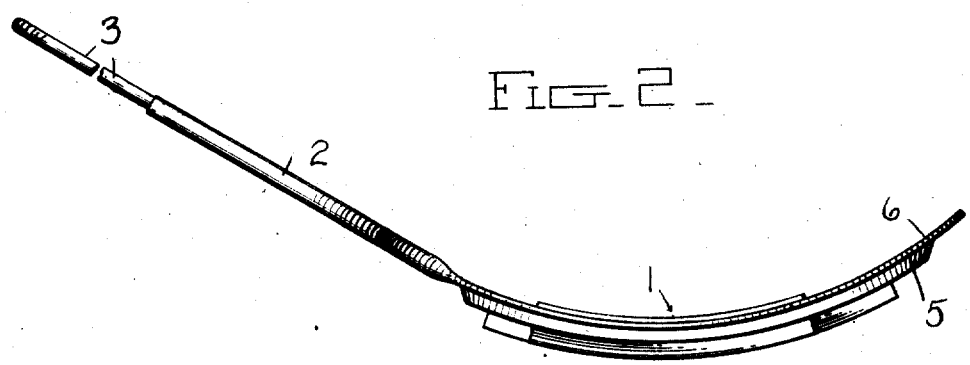
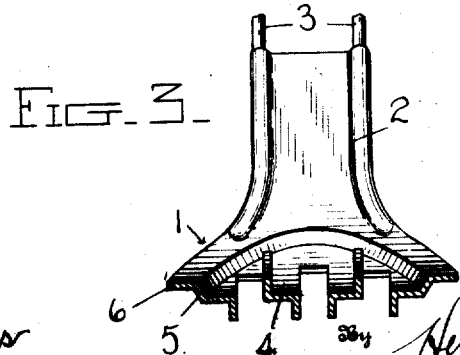

UNITED STATES PATENT OFFICE.

AARON J. SALTSMAN, OF CHICAGO, ILLINOIS, ASSIGNOR TO RACHEL B. SALTSMAN, OF CHICAGO, ILLINOIS.

CAKE-MIXER AND EGG-BEATER.

No. 900,210.

Specification of Letters Patent.

Patented Oct. 6, 1908.

Application filed November 29, 1907. Serial No. 404,461.

*To all whom it may concern:*

Be it known that I, AARON J. SALTSMAN, a citizen of the United States, residing at Chicago, in the county of Cook, in the State of Illinois, have invented certain new and useful Improvements in Cake-Mixers and Egg-Beaters, of which the following is a specification.

This invention relates to new and useful improvements in cake mixers and egg beaters, and aims to provide a device of the general type set forth which shall be effective for all the uses to which these are generally put, and incidentally as a fish-scaler; a device which is simple and cheap to manufacture; and one which is made up of absolutely the minimum number of parts consistent with the proper strength, etc.

The invention consists of the elements, combinations, and arrangements of parts, all as will be hereinafter fully set forth, and succinctly defined in the appended claims.

In the accompanying drawings, which are to be taken as a part of this specification, and in which is illustrated a merely preferred form of embodiment of the invention, Figure 1 is a top plan view of a mixer and beater embodying my invention; Fig. 2 is an edge view of the same; and Fig. 3 is a section on the line 3—3 of Fig. 1, looking in the direction of the arrows.

The device is preferably of general spoon shape, having a beater or mixer portion, and a handle portion 2. By making the handle portion integral with the main part of the device the structure is unitary, though I prefer to provide, for the sake of rigidity and cheapness, a handle extension comprising a U-wire 3, the legs of which are held respectively between the handle portion 2 and the overturned edges thereof. For the sake of rigidity, also, the bending of the edges may be continued throughout the whole extent of the article, the mixer part as well as the handle part.

The mixer part of my device comprises a body portion 4 which is provided with grid bars 5, preferably integral with the body, and formed by cutting the material of the body portion longitudinally and transversely, and bending the longitudinal edges of the bars thus defined in opposite directions to form projecting flanges, which serve as mixing blades, and also as scrapers, when the device is used for instance as a fish-scaler. Said flanges extend decidedly beyond the plane of the body portion on each side thereof, and the body portion, near its periphery, is provided with an upstanding flange 5, carrying an integral ledge 6, which joins the handle portion 2 of the device. The upwardly extending flanges of the grid bars extend beyond the plane of said ledge, so that the portion 1 presents scraping members on both sides thereof.

The operation of the device will be readily apparent. Where it is used as a cake mixer or egg-beater, the grid members, with the oppositely extending flanges, in connection with the fact that the portion 1 is abruptly dished by means of the flange connection 5, cuts and mixes the material operated on in a very thorough manner. When the device is used as a scraper or fish scaler, either side of the device may be used, the respective grid flanges extending beyond the plane of the device as described. Besides the greater efficiency of this device over those now in use, a distinct advantage lies in the simplicity of the device, and the fact that it comprises essentially one piece of metal.

It is to be understood that materials, sizes, and relative arrangements of parts which have not been specified, are considered within the discretion of the manufacturer, being unimportant and not affecting the scope of the invention, where not inconsistent with the following claim, and so that the objects of the invention be subserved.

What I claim is:—

In a device of the kind described, a body portion, a flange surrounding the same and carrying an integral ledge, and a grid formed in said body portion, the bars or flat portions whereof are provided with oppositely extending vertical longitudinal flanges whose edges extend beyond the planes of the body and the ledge respectively.

In witness whereof I hereunto affix my signature in presence of two witnesses.

AARON J SALTSMAN.

Witnesses:
ROBERT A. BURTON.
ROSE DELLHEIM.